J. J. DUFFY.
TRANSMISSION MECHANISM.
APPLICATION FILED MAR. 26, 1919.

1,342,587.

Patented June 8, 1920.
4 SHEETS—SHEET 1.

Witnesses:
W. F. Kilroy
Harry R. L. White

Inventor:
Joseph J. Duffy
By Brown, Boettcher & Dienner
Attys.

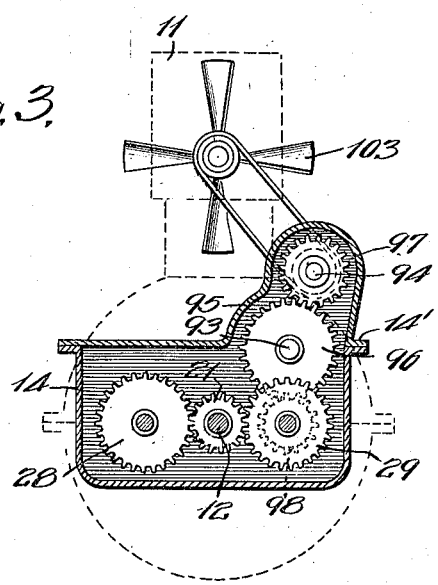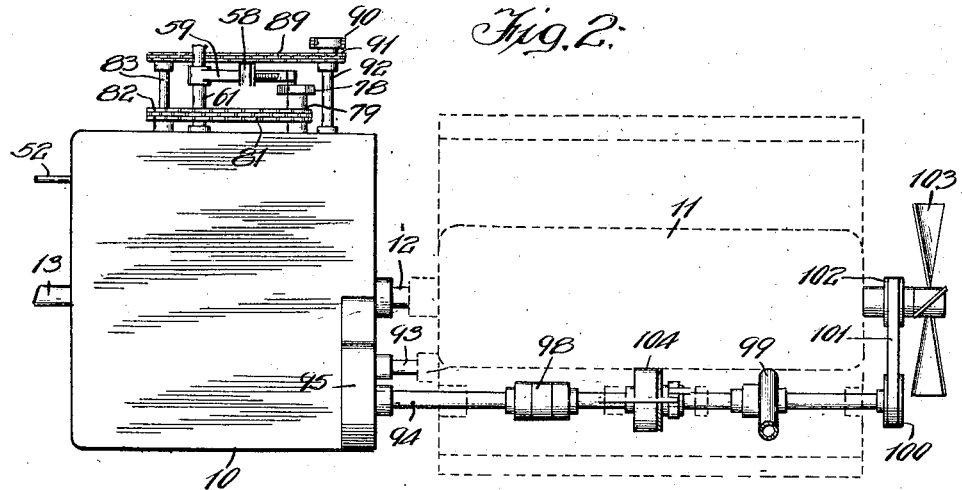

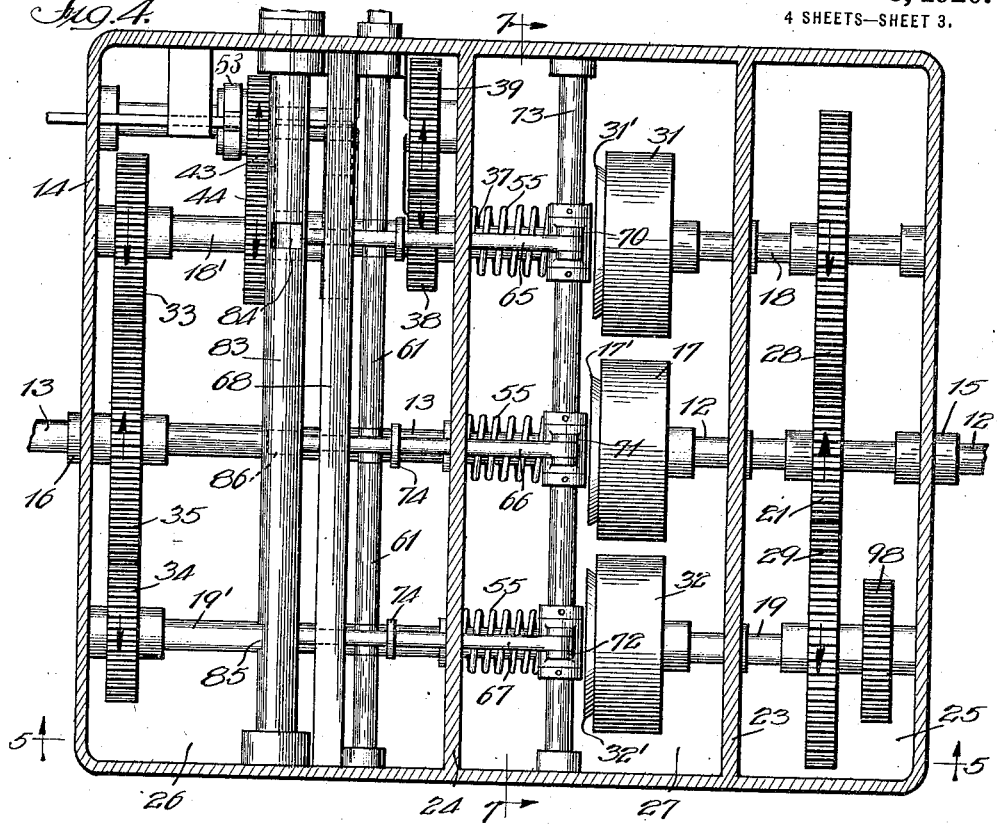

J. J. DUFFY.
TRANSMISSION MECHANISM.
APPLICATION FILED MAR. 26, 1919.

1,342,587.

Patented June 8, 1920.
4 SHEETS—SHEET 4.

Witnesses:
W. J. Kilroy
Harry R. L. White.

Inventor:
Joseph J. Duffy
By Brown Boettcher & Dienner
Attys

UNITED STATES PATENT OFFICE.

JOSEPH J. DUFFY, OF CHICAGO, ILLINOIS.

TRANSMISSION MECHANISM.

1,342,587.           Specification of Letters Patent.     Patented June 8, 1920.

Application filed March 26, 1919. Serial No. 285,220.

*To all whom it may concern:*

Be it known that I, JOSEPH J. DUFFY, a citizen of the United States, residing at Chicago, in the county of Cook and State of Illinois, have invented a certain new and useful Improvement in Transmission Mechanism, of which the following is a full, clear, concise, and exact description, reference being had to the accompanying drawings, forming a part of this specification.

My invention relates to transmission mechanisms for automobiles and the like.

My invention has been conceived for the primary purpose of simplifying the operations incident to driving an automobile, of the internal combustion engine type. To this end I have devised an improved transmission system combining the functions of the clutch mechanism and the gear ratio mechanism. The ultimate object of this form of transmission system is to perform all the operations of starting and stopping of the car, and making changes in the gear ratio mechanism through the operation of a single control element. This control element preferably takes the form of a foot pedal, corresponding to the clutch pedal characteristic of the usual automobile construction. By performing simple operations of this one control element, the transmission ratios are selected for governing the speed of the vehicle and the clutching mechanism between the engine shaft and propeller shaft is actuated for controlling the propulsion of the vehicle. It will be apparent that by controlling both the transmission mechanism and the clutch mechanism through this one control pedal, the task of making speed changes in the transmission mechanism and the controlling of the propulsion of the car is greatly simplified. A notable feature of this simplicity of control is the fact that it is conducive to safer and easier driving by avoiding the necessity of the driver removing either hand from the steering wheel and also avoiding the momentary distraction caused by reaching for and actuating the gear shift lever.

A particular utility of my improved transmission mechanism follows from the fact that the gears used in the ordinary running of the car are always in mesh, and hence are practically impossible to strip or mutilate by careless or ignorant operation. As a consequence, the present transmission mechanism is practically foolproof and does not require any degree of skill for its successful operation.

A further object of my invention is to obviate the objectionable noise from the timing gears employed for driving the cam and pump shafts. Heretofore, these gears have been situated at the front end of the engine where they are covered by a housing plate and in such location usually have direct access to the crank case from which they are lubricated by splash or gravity feed of the oil from the crank case. In the present construction I have placed these gears at the rear end of the engine and have completely housed them in the grease-tight transmission housing. By this arrangement I am enabled to pack these gears in grease and thereby eliminate all objectionable noise therefrom.

A further object of my invention is to provide means for quickly and easily controlling the temperature of the internal combustion engine. This I accomplish by stopping the circulation of the cooling water and also stopping the circulation of air through the radiator, by the disconnection of suitable clutch means governing the application of power to the water pump and to the radiator fan. The provision of this clutch has particular coöperation with the disposal of the timing gears in the transmission housing, as will be apparent from the following description.

In the accompanying drawings in which I have illustrated a preferred embodiment of my invention, Figure 1 is a side elevational view of my improved transmission mechanism in operative association with an internal combustion engine;

Fig. 2 is a plan view of the same;

Fig. 3 is a sectional view taken on the line 3—3 of Fig. 1;

Fig. 4 is a horizontal sectional view through the transmission housing showing the transmission mechanism in plan;

Fig. 5 is a sectional view of the transmission mechanism taken on the line 5—5 of Fig. 4;

Figure 1:
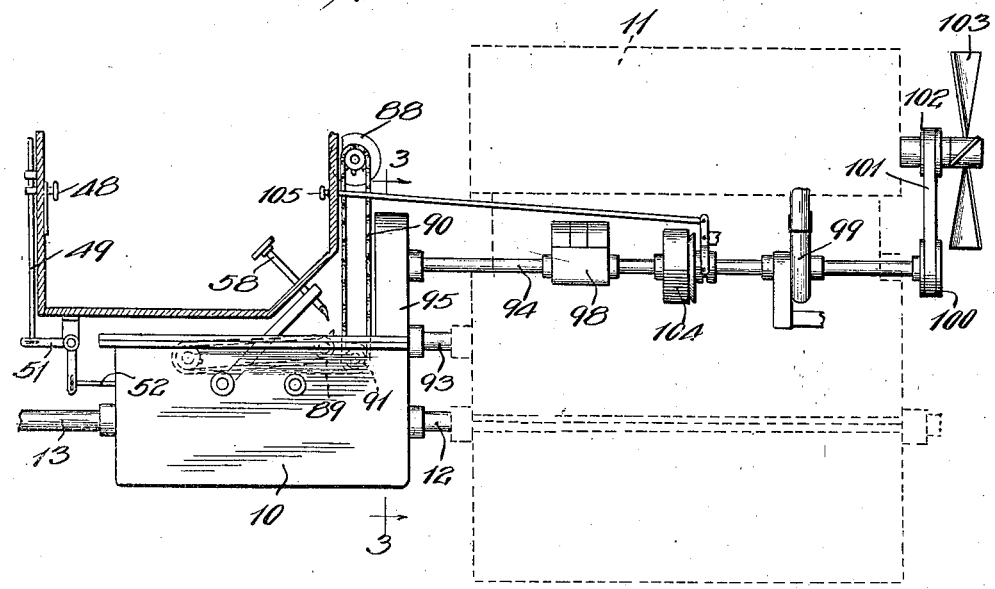

Referring particularly to Fig. 1, it will be noted that the transmission mechanism, which I have designated 10, is located directly behind the engine 11 and has direct connection therewith through the engine shaft 12 without the interposition of any clutch mechanism. As I have previously said, both the clutching and change speed operations are performed in this transmission mechanism. Extending out from the rear of the transmission 10 is the propeller shaft 13 which extends back to the rear axle for the propulsion of the vehicle. I shall refer to the propeller shaft 13 as the "driven shaft" as distinguished from the engine shaft 12 which I shall refer to as the "driving" shaft.

Referring to Fig. 4, it will be noted that the two shafts 12 and 13 extend into the transmission housing 14 in axial alinement with each other, through the centrally disposed bearings 15 and 16. The driving shaft 12 is continued back through a bearing in the wall or partition 23 and into a central compartment 27 where it carries the driving element of a friction clutch 17. The driven shaft 13 is extended forward through a suitable bearing in the partition 24 and into the central compartment 27, where it carries the coöperating driven element of the friction clutch 17. It will be apparent that engagement of the friction clutch 17 is operative to place the two shafts 12 and 13 in direct drive, which corresponds to third or high speed of the transmission mechanism. The engagement of the friction clutch 17 is under the control of novel selector mechanism which is in turn under the control of the actuating or control pedal, as I shall hereinafter describe.

Figure 8:
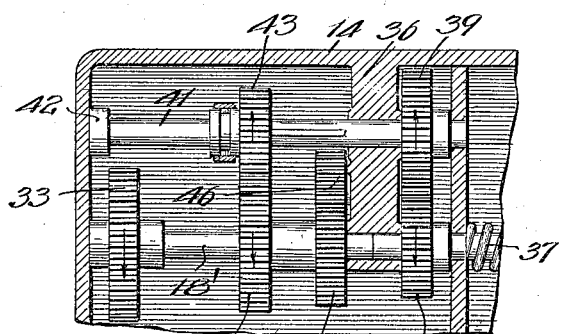
Fig. 8 is a fragmentary plan view of the transmission mechanism illustrating the details of the reverse gearing.
Figure 6:
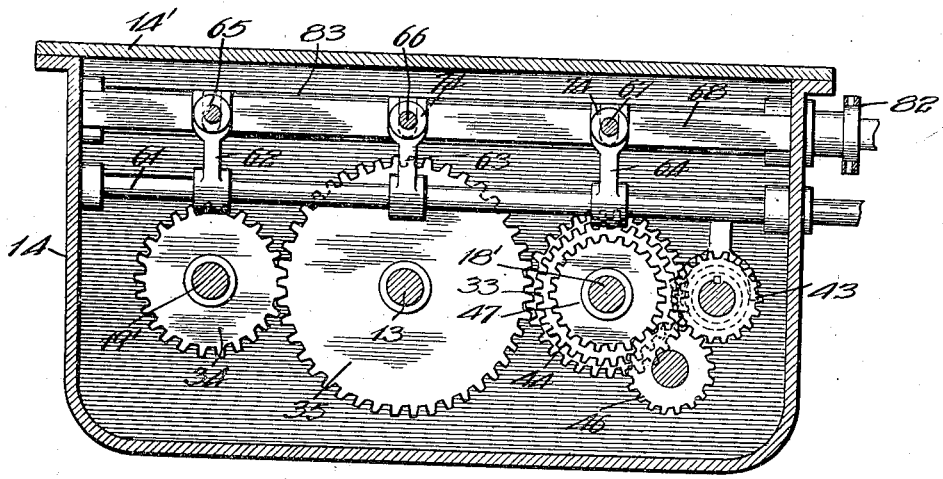
Fig. 6 is a similar view taken on the line 6—6 of Fig. 5.

Disposed on opposite sides of the shafts 12—13 and extending parallel thereto, are two transmission or countershafts 18 and 19. The driving shaft 12 is geared to each of these countershafts by a small gear 21 on the driving shaft, meshing with a relatively large gear 28 on the first speed countershaft 18, and with another relatively large gear 29 on the second speed countershaft 19. Both countershafts 18 and 19 are journaled in suitable bearings in the housing 14 and partition 23. These shafts extend into the central compartment 27 where each support the driving element of a friction clutch 31 and 32. The rear ends of these countershafts, which are designated 18' and 19', are geared in a reduction ratio to the propeller shaft 13 by small gears 33 and 34, meshing with a relatively large gear 35 on the shaft 13. The rear section 19' of the second speed countershaft 19 is journaled in a suitable bearing in the end wall of the housing 14 and extends through a suitable bearing in the transverse partition 24, into the central compartment 27 where it has operative connection with the driven clutch member of the friction clutch 32. The rear section 18' of the first speed countershaft is journaled at its rear end in a suitable bearing in the end wall of the housing 14 and is journaled at its front end in a bearing bracket 36 extending inward from the side wall of housing 14, as clearly shown in Fig. 8. A stub shaft 37, which is alined with the shaft 18', extends from the bearing bracket 36 through the transverse partition 24 and into the central compartment 27, where it has operative connection with the driven element of the friction clutch 31. This stub shaft carries a gear 38 which meshes with a gear 39 on a reversing countershaft 41, which has bearing engagement in the bracket 36 and bearing 42. The gear 38 is smaller than the gear 39, whereby the stub shaft 37 will drive the countershaft 41 at a reduced speed, when the clutch 31 is engaged during reverse or low speed operation. A small gear 43 on the reversing countershaft 41, normally meshes with a relatively large gear 44 on the shaft 18' and, when the friction clutch 31 is engaged, operates to drive the countershaft 18' at a further reduction of speed. The reduction for first speed can be obtained in the gears 38—39 and 43—44, or in the gears 21—28 and 33—35, or the reduction can be distributed between both sets of gears by the proper proportioning thereof. The small gear 43 is splined on the reversing countershaft 41 and is adapted for shiftable movement along this shaft in order that it may be brought into mesh with a reversing idler pinion 46, which is pivoted on the side of the bearing bracket 36, below and between the countershafts 18' and 41 (Fig. 6). The idler pinion 46 meshes with a reversing gear 47 rigidly mounted on the countershaft 18'. It will be apparent that when the shiftable gear 43 is brought into mesh with the idler pinion 46, the direction of drive from the countershaft 41 to the countershaft 18' will be reversed and consequently the gear 33 will operate to drive the gear 35 and propeller shaft 13 in a reverse direction.

The shifting of the gear 43, in the operation of reversing, is effected by any suitable control device located convenient to the driver. In Fig. 1 I have illustrated a handle 48 on the front of the driver's seat for performing this reverse shift. The handle 48 has attachment with a reciprocal rod 49 which has pivotal attachment with one arm of a bell crank lever 51 pivoted below the floor board of the driver's compartment. The other arm of the bell crank lever 51 has pivotal connection with a horizontal shifting rod 52, extending through the end wall of the transmission housing 14. This shifting rod 52 has operative connection with a shifting fork 53 engaging in the grooved hub 54 on the side of the shiftable gear 43.

Referring again to the friction clutches 17, 31 and 32, each of the clutch cones 17', 31' and 32' is arranged for shiftable movement along its associated shaft either by being splined thereto or engaging over a squared section on the end of the shaft. Each of these cones normally tends to engage the driving element of the associated clutch under the action of a powerful compression spring 55, which is confined between the partition 24 and a grooved collar 56 on the back of the cone. These clutches may be of the disk type, if desired, or any other preferred type. I preferably isolate the clutches from the remainder of the transmission housing 14 through the provision of the transverse partitions 23 and 24 which divide the housing into the two end compartments 25 and 26 and the central compartment 27. By this construction, the two end compartments 25 and 26 can be packed with grease or a heavy lubricant for lubricating and silencing the ratio gears without subjecting the clutches to this grease.

Figure 7:
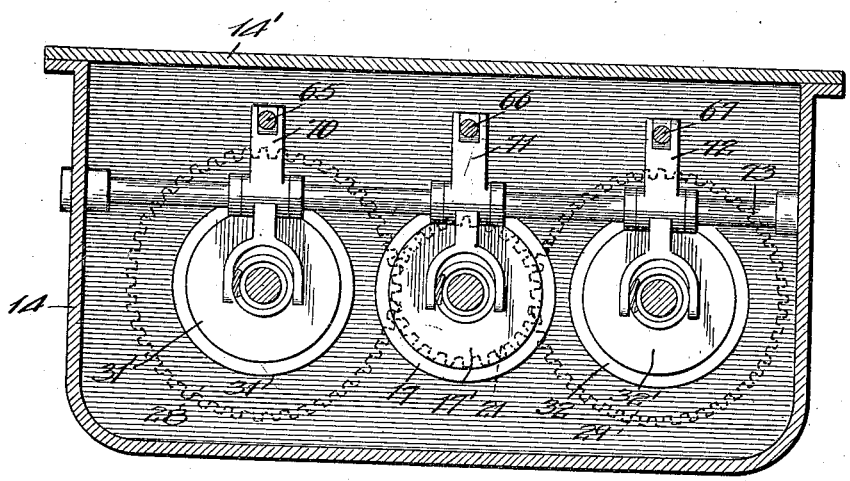
Fig. 7 is a similar view taken on the line 7—7 of Fig. 4.

I shall now describe the mechanism by which the clutches are engaged either in progressive or selective series in performing the operations of starting and stopping the car and making ratio changes in the transmission mechanism. The pedal 58, through which the clutching and change speed operations are controlled, is carried on the end of a clutch operating lever 59 and is arranged to project up through the sloping foot board in the precise manner of the ordinary clutch pedal. The clutch operating lever 59 continues down alongside of the transmission housing 14 where it is mounted on the end of an operating shaft 61 extending transversely through the housing 14 and having bearings in the side wall thereof. Rigidly mounted on this operating shaft and in line with the transmission shafts 13, 18' and 19' are the three forks 62, 63 and 64 which extend upward from the operating shaft and embrace the three clutch control rods 65, 66 and 67, as will be apparent from Fig. 6. These control rods are guided for reciprocating motion by passing through holes in the partition 24 and having their rear ends guided in holes in the transverse guide bar 68. The forward ends of the clutch control rods have pivotal attachment with the upper arms of a series of clutch operating forks 70, 71, 72, one for each of the transmission clutches 17, 31, and 32. This arrangement is clearly illustrated in Fig. 7, and it will be noted that these clutch operating forks are rotatably mounted between collars on a pivot shaft 73 extending transversely of the housing 14. The clutch operating forks have lower forked ends engaging in the grooved collars 56 on the back of the releasable clutch elements 17', 31' and 32'. The upright forks 62, 63 and 64 are adapted to coöperate with collars 74 pinned on the clutch control rods 65, 66 and 67. The relation is such that by slightly depressing the control pedal 58 any of the transmission clutches 17, 31 or 32 which may be engaged, will be released by the action of the forks 62, 63 and 64 engaging with the collars 74 on the clutch control rods.

The starting and stopping of the car is thus controlled by the initial range of movement of the pedal 58, the latter part of the pedal stroke functioning to selectively change the gear ratios of the transmission mechanism.

It will be noted that on the lower end of the pedal 58 I have pivoted a spring pressed pawl 76 which is adapted to engage the teeth 77 of an advancing wheel 78 in the latter part of the stroke of the pedal 58. There are preferably four of these teeth 77 placed equi-distantly about the wheel 78 whereby a complete stroke of the control pedal 58 will advance the wheel 78 one quarter of a revolution. The advance wheel 78 is pivoted on a sub-shaft projecting from the side of the housing 14 and carries a sprocket 79 over which a chain 81 is trained, as is clearly shown in Fig. 2. The chain 81 extends back along the housing 14 and encircles a sprocket 82 on the selector shaft 83 which extends transversely through the housing 14 and has bearing engagement in the side walls thereof. The selector shaft 83 is disposed directly behind the guide bar 68 and preferably consists of a large round shaft provided with pockets or recesses 84, 85 and 86 milled in its periphery in line with the clutch control rods 65, 66 and 67 respectively. When pressure is taken off the control pedal 58 these clutch control rods come back against the selector shaft 83 under the action of their compression springs 55. When the control rods come up against the circular periphery of the selector shaft their respective clutches are held out of engagement. Conversely, when one of the pockets in the selector shaft 83 advances into coincidence with the end of any one control rod, the friction clutch controlled by that rod is free to engage by the motion of the rod moving back onto the pocket under the action of the clutch spring 55. The pockets 84, 85 and 86 are spaced at quarter turn intervals about the periphery of the selector shaft 83. Inasmuch as there are only three of these pockets there is a neutral position of the selector shaft in which all of the friction clutches are held disengaged by the engagement of their control rods with the circular periphery of the selector shaft. This position of the selector shaft is illustrated in Fig. 4. The pockets in the selector shaft 83 are arranged progressively about the shaft so that in the rotation thereof they come into coincidence with the clutch control rods in the order of their speeds—first speed, second speed, and third speed.

The operation of my improved transmission mechanism is as follows: Consider the control pedal 58 as being depressed with the transmission in the neutral position shown in Figs. 4 and 5. The initial part of the stroke of the pedal will relieve the selector shaft 83 of the thrust of the clutch control rods by the engagement of the forks 62, 63 and 64 with the collars 74 on these rods. The continuation of the pedal stroke will bring the pawl 76 into engagement with the teeth on the wheel 78 and advance the latter one quarter of a revolution, thereby turning the selector shaft 83 an equal amount and bringing the first speed pocket 84 into register with the clutch control rod 65 of the first speed clutch 31. Upon releasing the pedal 58, engagement of the clutch 31 results in a low speed drive from the driving shaft 12, through the countershaft 18, through the two pairs of reduction gears 38—39 and 43—44, and through the gears 33 and 35 to the propeller shaft 13. Assume that the driver wishes to go into second speed. He depresses the control pedal 58 a full stroke, the first part of which releases the clutch 31 and the latter part of which advances the selector shaft 83 so as to bring the second speed pocket 85 into register with the clutch control rod 67. Upon allowing the pedal 58 to return, the clutch 32 becomes engaged while the clutch 31 is held disengaged, thus obtaining a second speed ratio through the countershaft 19. When the driver wishes to go into third speed he merely repeats the operation of depressing the pedal 58, by the action of which the second speed clutch 32 is disengaged and the third speed pocket 86 brought into register with the clutch control rod 66. Upon releasing the pedal the clutch 17 engages and a direct drive is obtained from the driving shaft 12 to the propeller shaft 13.

Obviously, when it is desired to release the engaged clutch, without changing speeds, as for the purpose of stopping the car or allowing the same to coast, the pedal 58 is only depressed part way, or just sufficient to throw out the clutch without engaging the teeth on the advancing wheel 78.

In the event that the driver wishes to make a selective change, as from first to third speed, he depresses the control pedal the full stroke, allows the pedal to come back part way, or just to the clutching position, then depresses it again,—thereby skipping one speed and selecting the next succeeding one,—and then completely releases the control pedal, whereupon the selected speed will be clutched in driving relation.

The act of depressing the control pedal and then releasing it only part way before again depressing it, skips a ratio by advancing the selector shaft 83 without permitting engagement of the clutch of the previous ratio. This skipping operation may be utilized in any part of the cycle for skipping any ratio or neutral, as for example in going from third speed into first. Furthermore, this skipping operation may be repeated for the purpose of skipping two speeds or one speed and neutral as in going from second speed into first, or from third speed into second.

To afford an indication of what speed the transmission is in, I have provided an indicating wheel 88 (Fig. 1) which bears legends adapted to show through an aperture in the dash and indicate the condition of the transmission mechanism. The indicating wheel 88 is advanced in synchronism with the selector shaft 83 through a pair of belts or chains 89 and 90. The chain 89 extends from a sprocket on the end of the selector shaft 83, over a double sprocket 91, pivoted on the end of a stub-shaft 92, which projects laterally from the transmission housing 14 (Fig. 2). The chain 90 extends up from the double sprocket 91 and is trained over a sprocket on the indicator wheel 88.

It will be obvious that when it is desired to place the transmission in reverse drive, the handle 48 is first actuated and the transmission mechanism is then placed in the condition corresponding to first speed.

Referring to Figs. 1 and 2, it will be seen that I have extended the engine cam shaft 93 and the magneto or pump shaft 94 back from the rear of the engine 11 and into the housing of the transmission mechanism 10. To accommodate the timing gears for these shafts, the housing cover 14' is formed with a housing extension 95 extending upwardly from the cover and provided with bearings for the shafts 93 and 94. The cam shaft 93 carries a timing gear 96 and the magneto or pump shaft 94 carries a timing gear 97, which meshes with the lower gear 96. (Fig. 3). The drive for these timing gears is through a pinion 98 on the second speed countershaft 19, the pinion 98 meshing with the timing gear 96. The housing extension 95 is packed with grease or other heavy lubricant to lubricate these timing gears and, more essentially, to muffle the whirring noise characteristic of these gears.

A magneto 98 and a rotary pump 99, of conventional types, are interposed in the shaft 94. The shaft 94 has suitable bearing support at the front of the engine 11 and is provided with a belt pulley 100 for driving the fan belt 101. This fan belt extends up over a pulley 102 on the fan shaft and drives the fan 103.

Interposed in the shaft 94 between the magneto 98 and pump 99 is a small clutch 104. The shiftable element of the clutch is arranged to be operated by a clutch control member 105 extending up to an accessible point on the dash. When the driver wishes to quickly bring the motor up to an efficient temperature, he disengages the clutch 104 through operation of the control member 105 and thereby stops the circulation of cooling water through the cylinder jackets and also stops the current of air through the radiator. By stopping the fan 103 the capacity of the radiator for cooling any thermo-siphon circulation therethrough is greatly decreased, and the cylinder blocks are no longer subjected to the cooling influence of the fan breeze.

The feature of controlling the temperature of the engine by stopping the water pump 99 and radiator fan 103 in this manner, is made comparatively simple by the location of the timing gears for the pump shaft at the rear of the engine or in the transmission housing. The interposition of the clutch 104 in the pump shaft 94 also tends to deaden the transmission of sound or vibration along the shaft.

From the nature of my invention it will be apparent that numerous modifications may be made by one skilled in the art, but I intend that these modifications shall come within the spirit and scope of the appended claims.

I claim:

1. In an automobile transmission mechanism, a motor, a driving shaft extending from said motor, a driven shaft for propelling the automobile, ratio changing mechanism between said driving and driven shafts, and a single control member for selectively and progressively effecting changes in said ratio changing mechanism and for operatively connecting said driving and driven shafts in driving relation.

2. In an automobile transmission mechanism, a motor, a driving shaft extending from said motor, a driven shaft for propelling the vehicle, ratio changing mechanism between said driving and driven shafts, and a single foot operated control member for placing said ratio changing mechanism in any of a plurality of driving ratios and for operatively connecting said driving and driven shafts in driving relation.

3. In an automobile transmission mechanism, a motor, a driving shaft extending from said motor, a driven shaft for propelling the automobile, ratio changing mechanism between said driving and driven shafts, and a control member adapted by a single operation to change the driving ratio of said ratio changing mechanism in selective or automatic progressive sequence and to operatively connect said driving and driven shafts in driving relation.

4. In an automobile transmission mechanism, a motor, a driving shaft extending from said motor, a driven shaft for propelling the automobile, ratio changing shafts connecting said driving and driven shafts, clutch mechanism controlling said ratio changing shafts, and a pedal control member coöperating with said clutch mechanism for effecting changes in the driving ratio between said driving and driven shafts in selective or automatic progressive sequence and for operatively connecting said driving and driven shafts in driving relation.

5. In an automobile transmission mechanism, a driving shaft, a driven shaft, a plurality of counter shafts connected to said driving and driven shafts in three forward speed ratios, a clutch interposed in each of said countershafts, selector mechanism for controlling the order of engagement of said clutches, said selector mechanism being operative to control the order of engagement in selective or automatic progressive sequence, and a control pedal for controlling the engagement of said clutches.

6. In a transmission mechanism, a driving shaft, a driven shaft, a plurality of countershafts connected to said driving and driven shafts in different speed ratios, a clutch interposed in each of said countershafts, control means for releasing all of said clutches, and selective means operated by the actuating motion of said control means for engaging any predetermined clutch.

7. In a transmission mechanism, a driving shaft, a driven shaft, a plurality of countershafts geared to said driving and driven shafts in different speed ratios, a clutch interposed in each of said countershafts, and pedal operated control means for releasing all of said clutches and operative to automatically engage said clutches in a progressive series.

8. In a transmission mechanism, a driving shaft, a driven shaft, a plurality of countershafts geared to said driving and driven shafts in different speed ratios, a clutch interposed in each of said countershafts, and pedal control means normally operating to automatically engage and release said clutches in a progressive series, said pedal control means being also operable to engage said clutches selectively.

9. In a transmission mechanism, a driving shaft, a driven shaft, a plurality of countershafts geared to said driving and driven shafts and operative to connect said driving and driven shafts in different driving ratios, a clutch interposed in each of said countershafts, pedal control means for releasing said clutches, and selector means operated by and during the stroke of said pedal control means for selectively engaging said clutches.

10. In a transmission mechanism, a driving shaft, a driven shaft, a plurality of countershafts geared to said driving and driven shafts and operative to connect said driving and driven shafts in different driving ratios, a clutch interposed in each of said driving shafts, a control pedal for releasing said clutches, and a selector shaft actuated by said control pedal for independently engaging said clutches.

11. In a transmission mechanism, a driving shaft, a driven shaft, a plurality of countershafts geared to said driving and driven shafts in different speed ratios, a clutch interposed in each of said countershafts, a control pedal for releasing said clutches, and selector mechanism for controlling the order of engagement of said clutches, said selector mechanism being advanced by the operation of said control pedal.

12. In a transmission mechanism, a driving shaft, a driven shaft, a plurality of countershafts geared to said driving and driven shafts in different speed ratios, a clutch interposed in each of said countershafts, a clutch control member for each of said clutches, a control pedal for releasing said clutches, and a selector shaft controlled by said control pedal and adapted to independently actuate said clutch control members.

13. In a transmission mechanism, a driving shaft, a driven shaft, a plurality of countershafts geared to said driving and driven shafts in different speed ratios, a clutch interposed in each of said countershafts, a control rod for each of said clutches, a control pedal having connection with said control rods and adapted to release said clutches, a selector shaft actuated by said control pedal, said control rods bearing against said selector shaft, and means on the selector shaft for actuating said control rods in predetermined sequence.

14. In a transmission mechanism, a driving shaft, a driven shaft, a plurality of countershafts geared to said driving and driven shafts in different speed ratios, a clutch interposed in each of said countershafts, a control rod for each of said clutches, a control pedal having connection with said control rods, and adapted to release said clutches, a selector shaft arranged to be advanced by said control pedal, said control rods normally bearing against the periphery of said selector shaft, said selector shaft having pockets therein for receiving the ends of said control rods in controlling the order of engagement of said clutches.

15. In a transmission mechanism, a driving shaft, a driven shaft, a pair of countershafts geared to said driving and driven shafts at different speed ratios, spring clutches interposed in said counter shafts, a clutch control rod for each of said clutches, an operating shaft, a control pedal for rotating said operating shaft, forks on said operating shaft engaging with said clutch control rods, said control pedal adapted to release any engaged clutch in the initial part of its stroke, a selector shaft, said clutch control rods having their ends normally engaging the periphery of said selector shaft under the tension of the clutch springs, pockets in the periphery of said selector shafts into which said control rods are adapted to reciprocate and thereby engage their clutches, and an advancing member operatively connected to said selector shaft and adapted to be engaged by said control pedal in the latter part of its stroke.

16. In combination, a transmission housing, driving and driven shafts extending into said housing, transmission gearing in said housing for operatively connecting said driving and driven shafts in a plurality of driving ratios, friction clutches in said housing controlling the operation of said transmission gearing, and partitions in said housing forming a separate compartment for said friction clutches.

17. In an automobile, a motor, a driving shaft extending from said motor, a driven shaft for propelling the automobile, transmission mechanism for connecting said driving and driven shafts in a plurality of driving ratios, a control pedal for selectively actuating said transmission mechanism, and indicator means independent of said control pedal for indicating the condition of said transmission mechanism.

18. In an automobile, a motor, a driving shaft extending from said motor, a driven shaft for propelling the automobile, transmission mechanism for gearing said driving and driven shafts in different speed ratios, clutch mechanism controlling the driving connections between said driving and driven shafts, a control pedal adapted to selectively actuate said clutch and transmission mechanisms, and an indicator member independent of said control pedal and operatively connected with said transmission mechanism for indicating the speed ratio selected by said control pedal.

19. In an automobile transmission mechanism, a driving shaft, a driven shaft, a plurality of counter shafts adapted to connect said driving and driven shafts in different driving ratios, a driving gear on said driving shaft, a gear on the adjacent end of each of said counter shafts, all of said latter gears meshing with said driving gear, a driven gear on said driven shaft, a gear adjacent the other end of each of said counter shafts, all of said latter gears meshing with said driven gear, clutches interposed in each of said counter shafts for controlling the drive therethrough, control means for actuating said clutches and selector means for selectively engaging said clutches.

20. In an automobile transmission mechanism, a driving shaft, a driven shaft, a plurality of countershafts adapted to connect the driving and driven shaft in different driving ratios, a driving gear on said driving shaft, gears on the adjacent ends of each of said counter shafts, meshing with said driving gear, a driven gear on said driven shaft, gears on the adjacent ends of each of said counter shafts meshing with said driven gear, a clutch interposed in each of said countershafts, one of said countershafts being divided into two sections, a sub-countershaft for said latter countershaft, gears connecting said sub-countershaft with both sections of said divided countershaft and control means for controlling the order of engagement of said clutches.

In witness whereof I hereunto subscribe my name this 19th day of March, 1919.

JOSEPH J. DUFFY.